United States Patent
Martinsson et al.

[11] Patent Number: 5,174,171
[45] Date of Patent: Dec. 29, 1992

[54] LENGTH ADJUSTMENT DEVICE

[75] Inventors: Ingemar Martinsson, Hisings Backa; Jan Karlsson, Västra Frölunda, both of Sweden

[73] Assignee: AB Volvo, Sweden

[21] Appl. No.: 807,959

[22] Filed: Dec. 10, 1991

Related U.S. Application Data

[63] Continuation of Ser. No. 580,802, Sep. 11, 1990, abandoned.

[30] Foreign Application Priority Data

Sep. 28, 1989 [SE] Sweden ................. 8903187

[51] Int. Cl.⁵ ............................................. G05G 1/04
[52] U.S. Cl. ..................................... 74/522; 403/93; 411/387; 74/526; 280/673
[58] Field of Search ............... 74/522, 526, 525, 523; 411/386, 393, 387; 403/92, 93; 280/846, 673, 236

[56] References Cited

U.S. PATENT DOCUMENTS

| | | | |
|---|---|---|---|
| 225,587 | 3/1880 | Garrigus | 403/93 |
| 1,934,456 | 11/1933 | Taylor | 74/516 |
| 2,167,910 | 8/1939 | Rottenburg | 85/1 |
| 2,545,279 | 3/1951 | Henderson | 74/523 |
| 3,318,182 | 5/1967 | Carlson | 411/387 |
| 3,942,816 | 3/1976 | Scherenberg et al. | 280/673 |
| 3,990,715 | 11/1976 | Shimada | 74/525 |
| 4,577,986 | 3/1986 | Wang | 403/93 |
| 4,601,244 | 7/1986 | Fischer | 74/522 |
| 4,770,559 | 9/1988 | Yoo | 403/93 |
| 4,852,425 | 8/1989 | Stocker | 74/586 |
| 4,953,894 | 9/1990 | Broszat et al. | 74/522 |

FOREIGN PATENT DOCUMENTS 139082 5/1985 European Pat. Off. .
1076523 8/1960 Fed. Rep. of Germany .

Primary Examiner—David A. Scherbel
Assistant Examiner—Winnie Yip
Attorney, Agent, or Firm—Lerner, David, Littenberg, Krumholz & Mentlik

[57] ABSTRACT

This invention relates to a length adjustment device for adjusting predetermined maximum or minimum playless distance between two points (A) and (B). Known devices of this kind require visual inspection during the adjustment. The invention avoids the necessity of visual inspection by arranging a protruding means (52) at the end surface of the adjustment screw (5). This protruding device (52) interacts with a slot (23) in one of the longish elements (2,3), which are pivotally cojoined and form the actual length adjustment device (1).

12 Claims, 2 Drawing Sheets

LENGTH ADJUSTMENT DEVICE

This is a continuation of application Ser. No. 07/580,802 filed Sep. 11, 1990 now abandoned.

BACKGROUND OF THE INVENTION

The invention relates to a length adjustment device, which makes it possible to adjust a predetermined maximum, preferably playless, distance between two points A and B or adjustment of a predetermined minimum distance between two points A and B. The device is preferably used together with links for vehicles, and especially at such locations where it would be difficult to inspect an installation by sight.

On the market today there is a large number of different length adjustment devices. Many of these length adjustment devices are arranged with a threaded element by means of which it is possible to adjust different lengths between two points A and B.

A known such device (in-house prior art) provides a length adjustment device for adjustment of a predetermined maximum or minimum, preferably playless, distance between two points A and B, which points are moveable in relation to each other, which length adjustment device comprises two substantially stiff longish elements pivotally joined by means of link, attachment devices for pivotal attachment of the length adjustment device between said points A and B, an adjustment screw and co-operating threads which are arranged at the first of said two longish elements, an interacting surface, arranged at the second longish element, said interacting surface co-operating with one of the ends of the adjustment screw for adjustment of said predetermined distance between A and B.

Such an element can either be used in order to adjust a maximum distance or a minimum distance. If the locating means of the threads for the adjustment screw is arranged opposite the pivot point of the device, it can be used for adjusting a maximum distance between A and B, whereas if the locating means of the threads is arranged between the pivot point and the attachment point, it can be used for adjusting a minimum distance between A and B. Accordingly, the device provides a stop in one direction between the points A and B between which it is attached, but allows movement between A and B in the other direction. The location of the locating means for the threads and, accordingly, the interacting surface determines if the device is provided for adjustment of a minimum or a maximum distance.

Very often it is of major importance that this minimum or maximum distance which is to be adjusted does not go beyond or below said predetermined value. Accordingly, it is important that the adjustment screw during adjustment is only rotated to this exact predetermined position. Further rotation of this adjustment screw, which moves the screw and thereby effects the adjustment device, could for example cause damage to either the adjustment device itself or any of the parts it is attached to. Therefore it is of utmost importance that the adjustment is done in a very precise manner. Previously this has been possible with known adjustment devices if it has been possible during the adjustment phase to have had good possibilities to inspect the adjustment by sight. Moreover, this adjustment process per se implies a rather time-consuming procedure, which is undesirable.

OBJECT AND SUMMARY OF THE INVENTION

It is an object of the invention to achieve an adjustment device which eliminates the above mentioned disadvantages and which makes it possible to adjust a predetermined maximum or minimum, preferably playless, distance between two points A and B, in a rational manner which does not require a visual check.

This object is attained by means of a device in accordance with the invention, wherein the end surface of the adjustment screw is provided with protruding means and the interacting surface is provided with a recession for co-operation with said protruding means.

BRIEF DESCRIPTION OF THE DRAWINGS

In the following, the invention will be described in more detail by means of a preferred embodiment with reference to the annexed figures, in which.

DESCRIPTION OF THE PREFERRED EMBODIMENT

Figure 1:
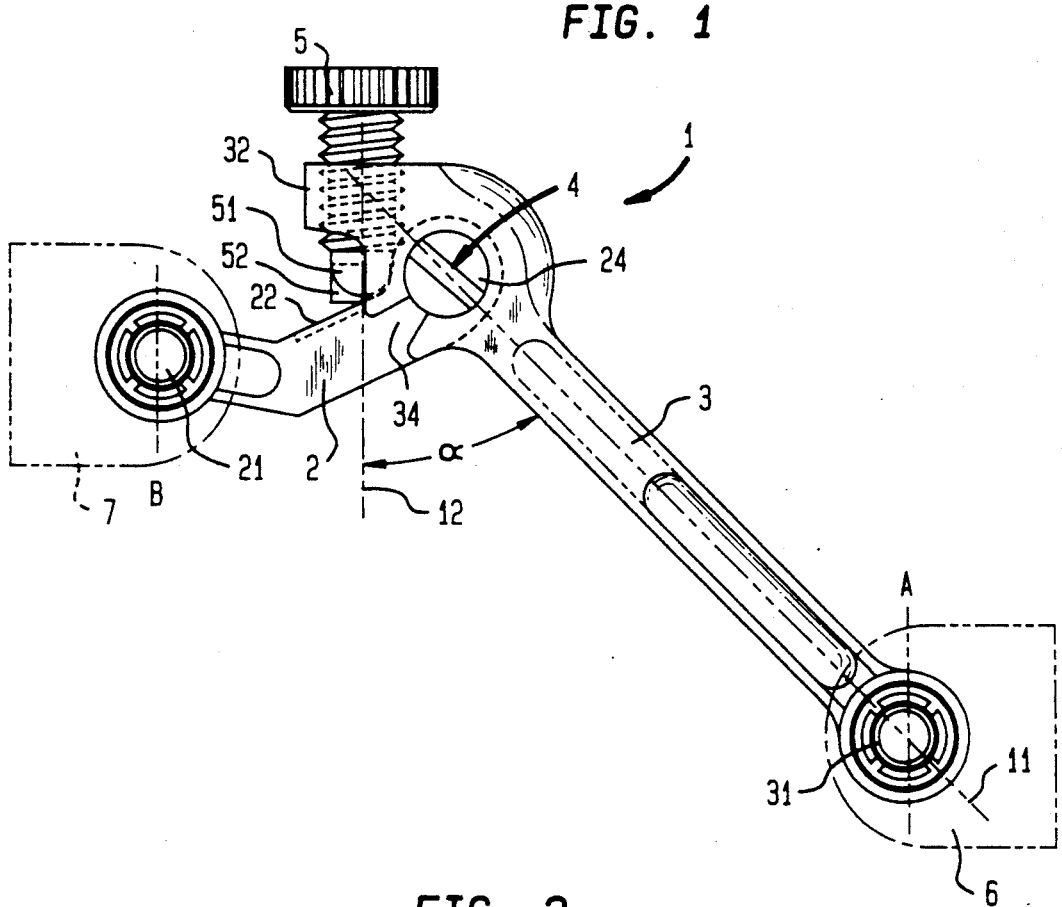
FIG. 1 is a side view of a preferred embodiment of the invention.

In FIG. 1 there is shown a length adjustment device for adjustment of a predetermined maximum distance between two points A and B. The device 1 comprises two longish elements 2,3 which are joined by means of a pivot point 4. The device 1 is, via its attachment points 21,31, fitted between two schematically shown means 6,7 between which said maximum predetermined distance is to be adjusted.

Furthermore, the device is arranged with an adjustment screw 5 of which one end surface 51 is meant to interact with interacting surface 22 arranged on one of said longish elements 2. A blade-like protruding device 52 which protrudes in the longitudinal direction of the screw and which transversely extends about half the diameter of the screw is arranged at the end surface 51. For interaction with said protruding device 52, the interacting surface 22 is arranged with a slot 23 which is v-shaped, converging towards the attachment point 21 (see FIG. 3).

The locating means for the threads 32 of the screw 5 is arranged on a first longish element 3 on the opposite side of the pivot point 4 in relation to the attachment point 31. An adjustment device of this kind makes it possible to adjust a predetermined maximum distance between two points A and B, in accordance with the following. In addition, first element 3 extends a first line 11 and screw 5 extends along a second line 12, such that first lines 11 and 12 form an acute angle a.

Before fitting the adjustment device 1 it is made certain that the screw 5 is in a position so that its end surface 51 does not protrude an substantial distance out of the locating means for the threads 32. Thereafter it should be checked that the means 6,7, between which the predetermined maximum distance between the points A and B is to be adjusted, are positioned so that the internal distance corresponds to said predetermined maximum distance. At this stage the adjustment device 1 can be fitted via its attachment points 21,31 to the means 6,7 respectively. A preferred way of attaching the adjustment device is by means of ball-shaped pivot points at said means 6,7, which interact with snap-fit attachment devices 21,31 of the adjustment device 1. After having fitted the adjustment device 1, (preferably by snap-fit), it is possible to adjust the maximum-allowed distance between the means 6,7 by rotation of the screw 5. When the end surface 51 of the screw 5 is almost in contact with the interacting surface 22 and further rotation of the screw is effected, it will occur that the blade-shaped protruding device 52 extends into the slot 23. Further rotation of the screw 5 is obstructed since the blade-shaped protruding device 52 interacts therein with one of the side surfaces of the slot 23. Accordingly, the predetermined maximum distance between the points A and B of the means 6,7 has been adjusted.

Hence it is possible by means of the device in accordance with the invention to achieve the above in a very rapid and rational manner, and without the need for visual checking. The person or robot who is fitting the device does not only get confirmation by an increasing rotational resistance when the protruding device 52 interacts with the slot 23 but also audible confirmation when snapping into the slot 23, which prevents possible damage.

Moreover, FIG. 1 shows that the first longish element 3 has openings 34, which facilitates the fitting of the interacting pivoting device.

Figure 2:
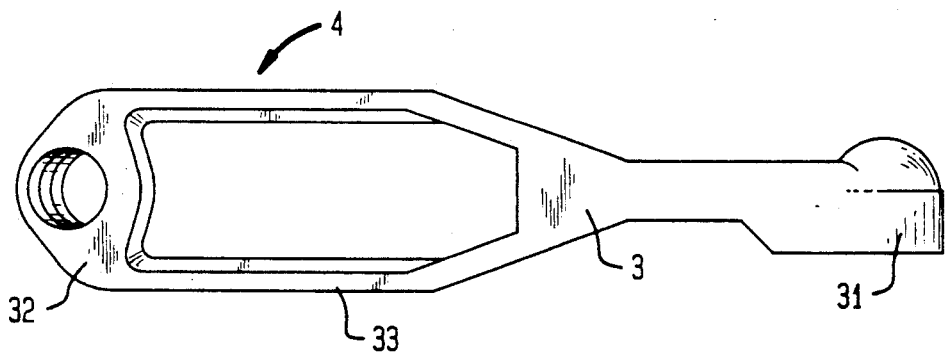
FIG. 2 shows the first longish element in a view from above.

FIG. 2 shows one embodiment of the longish element 3 seen from above. Since the element 3 is positioned in the plane of the paper, it is evident that the centre-line of the threads of the thread locating means 32, extends obliquely in relation to the extension of the element 3. In this preferred mode the angle is about 45°. Furthermore, it is shown that the pivot point 4 is made of two parallel sides having recessions (see FIG. 2) for the inter-acting part. The attachment device 31 consists of a spherically formed portion with a certain resiliency, so that the snap-fit action can be obtained when it is fitted onto a ball-joint.

Figure 3:
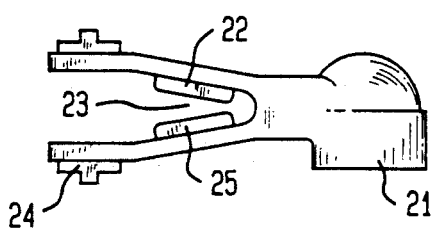
FIG. 3 shows the second longish element seen from above.

In FIG. 3 the second longish element is shown, in a view from above. Two leg-like parts 25 extend from the attachment point 21. At a first diverging portion of these leg-like parts 25 there is arranged an interacting means 22. This means consists of two blade-like devices attached on the inside of each leg 25, at said diverging portion, so that a slot 23 is formed which converges towards the attachment point 21. At the ends of each leg the pivoting points 24 of the device are arranged. Each pivoting device 24 consists of two parts. One inner part having a circular peripheral surface and an outer part which extends diametrically across the inner part. This special design of the interacting parts of the pivot point 2 makes it possible to join the two elements 2,3 of the adjustment device. By compressing the legs of the second longish element 2, and directing the outer part of the pivoting device 24 so that it corresponds to the direction of the opening 34, the longish elements 2,3 can be easily co-joined. Despite this simple way of co-joining the device, very secure fitting is achieved between the two longish elements, since the outer part of the pivoting device 24 in its active position is arranged substantially transversely in relation to the opening 34.

Figure 4:
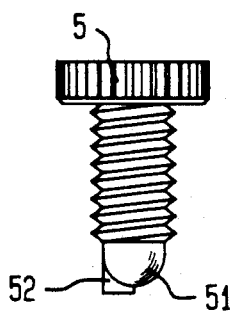
FIG. 4 shows the adjustment screw of the adjustment device.

In FIG. 4 the adjustment screw 5 of the invention is clearly shown. The screw 5 consists of the actuatable part 5 from which a threaded portion extends, and an inner end surface 51 which is spherical and on which there is arranged a blade-like device 52. This blade-like device 52 protrudes in the longitudinal direction of the screw and has a transverse extension corresponding to half the diameter. Thanks to the spherical form of the end surface 51, the device can be used with the desired effect at a great many different angles between the two longish elements 2,3.

Figure 5:
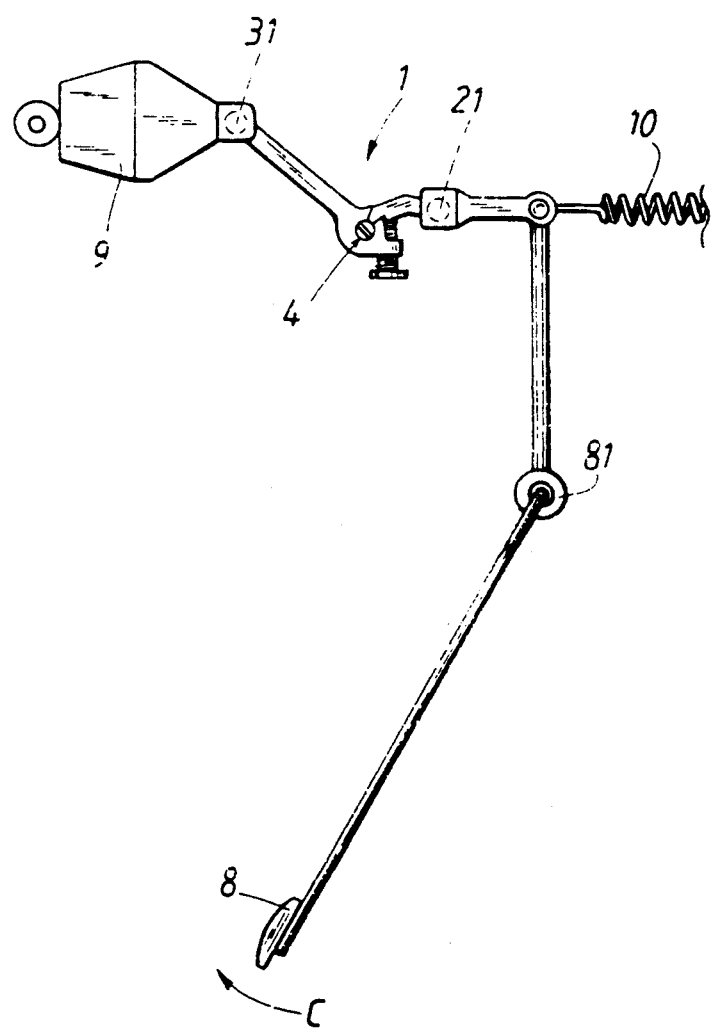
FIG. 5 shows a possible application of an adjustment device in accordance with the invention.

In FIG. 5 there is shown a preferred principal application of the device 1. The device is fitted to a constant speed-control device of a vehicle. A pedal for a throttle device, which is pivotally arranged about an axis 81, is affected by a force in a direction indicated by the arrow C, by means of an helical tension spring 10 which is arranged at the opposite side of the pivot 81. Adjacent the spring 10, one of the attachment points 21 of the adjusting device is fitted. The other attachment points 31 of the device is fitted to a vacuum-activated controlling device 9, which forms part of the cruise control.

The cruise control works in such a manner that if it is desired to retain a certain speed, this is indicated by activating a certain means (not shown). This, in turn, causes a signal to be transmitted which signal affects the vacuum-activated device 9, which is then evacuated so that it is compressed to a certain extent where it detects that the desired pedal-position is obtained (not further described). Accordingly, the vacuum-activated element 9 is locked at a certain position and it then has moved also the adjusting device 1 a corresponding distance, so that playless attachment is achieved between the spring 10 and the vacuum-activated element 9. The driver can now let his foot off the pedal 8 and the speed will be kept thanks to the constant positioning of the vacuum-activated element 9 and further means co-acting therewith (not shown). If, however, the driver wishes to leave this steady state, this can be done by depressing the pedal 8. A sensor (not shown) detects this activation, which in turn effects the deactivation of the vacuum-activated element 9. When the pedal is depressed the distance between the attachment points 21,31 of the adjustment device will be reduced. This reduction of the distance is allowed, since adjustment device 1 has an intermediate pivoting point 4.

The invention is not limited of what has been described above, but can be varied within the scope defined in the following claims. Accordingly, it is also possible to use the above-described principle to achieve a simple adjustment of a certain minimum distance. The locating means for threads 32, however, should then be located between the attachment point 31 and the pivot point 4. The interacting surface 22 will, in this modified application, be located on the opposite side, i.e. on that side where an acute angle is created between the two longish elements 2,3. For the skilled man it is evident that the design/arrangement of the two interacting parts 23,52 may be modified, e.g. a protruding pin which may interact with a slot or a hole.

What is claimed is:

1. A length adjusting device comprising first means defining a first point, second means defining a second point, said first point and said second point being movable with respect to each other between a first fixed distance and a second variable distance, a first longitudinally extending member pivotably connected to said first means, a second longitudinally extending member pivotably connected to said second means, said first and second longitudinally extending members being pivotably connected to each other at a predetermined pivot point, said first longitudinally extending member including thread means offset from said pivot point, and adjusting screw means adjustably threaded with said thread means, said adjusting screw means including a first end and a second end comprising a protruding member whereby said second end of said adjusting screw means projects from said first longitudinally extending member when said adjusting screw means is adjustably threaded with said thread means by a predetermined alterable distance, said second longitudinally extending member including an interacting surface comprising a recessed portion for interacting with said protruding member at said predetermined alterable distance whereby said second end of said adjusting screw means projects from said first longitudinally extending member and determines said first fixed distance between said first and second means.

2. The length adjusting device of claim 1 wherein said first fixed distance comprises a predetermined maximum distance between said first and second points, and wherein said thread means is located at a position on said first longitudinally extending member on the opposite side of said predetermined pivot point from said first attachment point.

3. The length adjusting device of claim 2 wherein said thread means is located adjacent to said predetermined pivot point.

4. The length adjusting device of claim 1 wherein said first and second longitudinally extending members are pivotable within a predetermined plane, and wherein said thread means is adapted to locate said adjusting screw means substantially in said predetermined plane.

5. The length adjusting device of claim 4 wherein said first longitudinally extending member extends along a first line, and wherein said thread means is adapted to locate said adjusting screw means along a second line, and wherein said first and second lines form an acute angle.

6. The length adjusting device of claim 5 wherein said acute angle is between about 10° and 80°.

7. The length adjusting device of claim 6 wherein said acute angle is between about 40° and 60°.

8. The length adjusting device of claim 1 wherein said second end of said adjusting screw means has a spherical shape.

9. The length adjusting device of claim 1 wherein said protruding member has a blade-like configuration.

10. The length adjusting device of claim 9 wherein said adjusting screw means has a predetermined radius, and wherein said blade-like configuration of said protruding member has a length substantially corresponding to said predetermined radius.

11. The length adjusting device of claim 1 wherein said recessed portion of said second longitudinally extending member comprises a slot.

12. The length adjusting device of claim 11 wherein said slot is defined by a pair of converging surfaces converging in a direction towards said second attachment point.

* * * * *

UNITED STATES PATENT AND TRADEMARK OFFICE
CERTIFICATE OF CORRECTION

PATENT NO. : 5,174,171
DATED : December 29, 1992
INVENTOR(S) : Ingemar Martinsson and Jan Karlsson It is certified that error appears in the above-indentified patent and that said Letters Patent is hereby corrected as shown below:

```
Column 2, line 57, after "extends" insert --along--.
Column 2, line 59, delete "a" and insert therefor --α--.
Column 6, line 10, delete "cute" and insert therefor --acute--.
```

Signed and Sealed this

Twenty-sixth Day of October, 1993

Attest:

BRUCE LEHMAN

*Attesting Officer*     *Commissioner of Patents and Trademarks*